United States Patent Office 2,887,677
Patented May 19, 1959

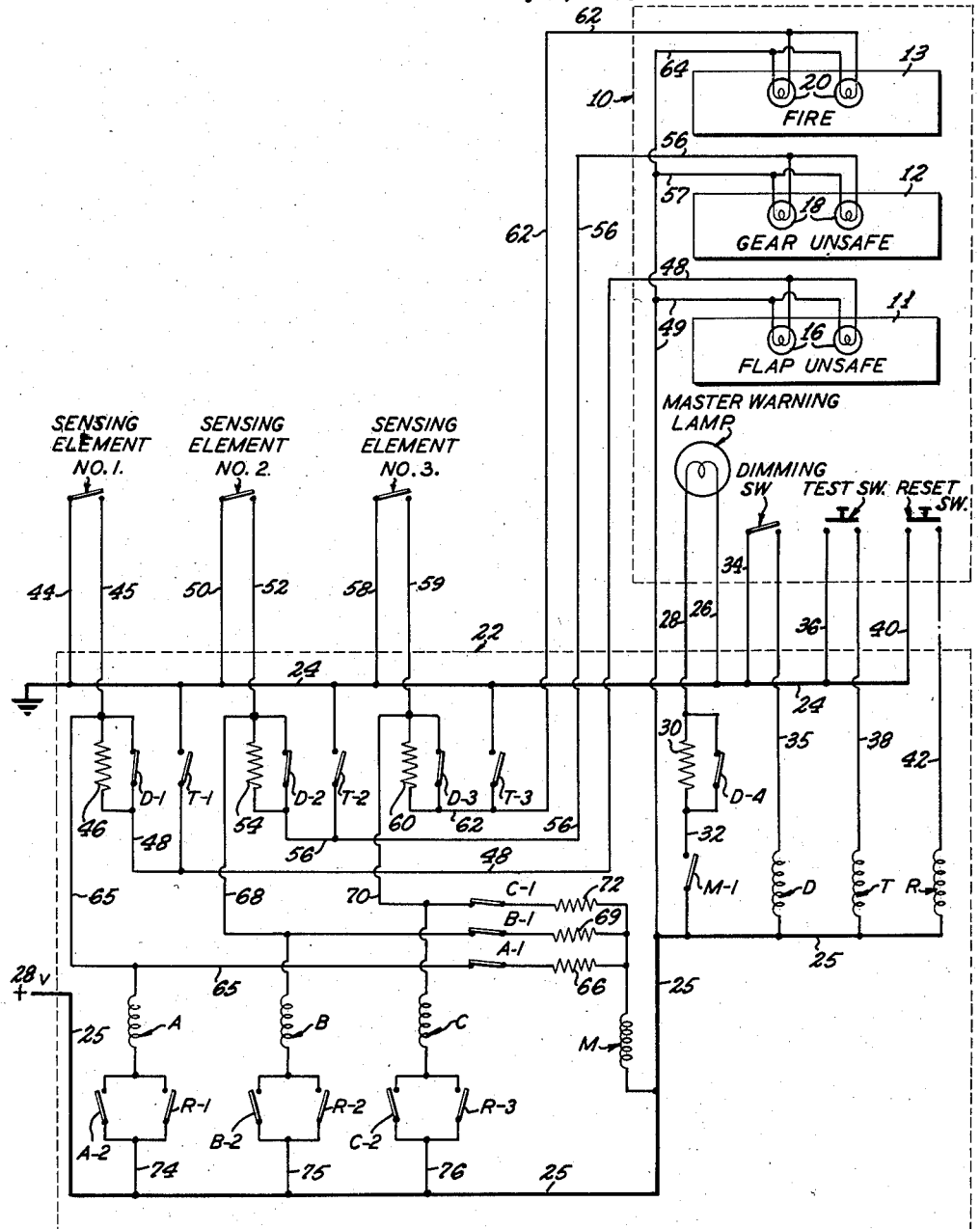

2,887,677

WARNING CONTROL SYSTEM CIRCUIT

William C. Arrasmith, Los Angeles, Calif., assignor to Radar Relay, Inc., Los Angeles, Calif., a corporation Application May 2, 1955, Serial No. 505,305

7 Claims. (Cl. 340—213)

This invention relates to a warning system to detect and indicate hazardous conditions at a plurality of points in an operating system. Such a warning system, for example, may be used on an aircraft to call attention to unsafe states of various components of the aircraft and to call attention to any hazardous rise in temperature that may occur in a vital region of the aircraft.

A warning system of the general character to which the invention pertains has a plurality of circuit-closing sensing elements and includes an annunciator unit having a corresponding plurality of panels of translucent material that may be illuminated by corresponding concealed lamps. The panels are lettered to identify the hazards they represent. Thus panels may be worded "flap unsafe," "fire," etc. In addition the annunciator unit has a master warning lamp that is also energized whenever one of the sensing elements illuminates a panel on the annunciator.

In accord with the present invention, the annunciator may additionally include a switch to dim the annunciator lamps as well as the master warning lamp, a push-button switch for testing all of the lamps and a push-button reset switch to deenergize the master warning lamp when an annunciator panel is illuminated thereby to ready the master warning lamp for a second warning operation in the event that a second sensing element becomes operative while the annunciator panel is still illuminated. The invention is directed to circuitry for such a warning system and the preferred practice of the invention is specifically directed to the circuitry of a control unit for the warning system to which the plurality of sensing elements and the associated annunciator unit may be connected, for example, by plug-in connections.

In a typical practice of the invention, the following requirements are to be met:

(1) A warning signal created by any of the sensing elements shall cause the corresponding annunciator panel lamp to be energized together with the master warning lamp;

(2) Pressing the push-button reset switch while an annunciator panel is illuminated shall cause the master warning lamp to be deenergized without terminating the illumination of the annunciator panel; and (3) If a second sensing element closes a second warning circuit after the master warning light is deenergized and while the first sensing element is still illuminating the first annunciator panel, the master warning lamp shall again be energized along with the second annunciator panel and if the push-button reset switch is then pressed the master warning lamp will be again deenergized. The warning system shall be designed in such manner that this sequence may be continued until all of the annunciator panels are illuminated;

(4) Whenever the master warning lamp is energized along with one or more annunciator panel lamps, the master warning lamp shall be deenergized automatically when the last of the annunciator lamps is deenergized. Thus if a single sensing element operates only temporarily to energize an annunciator panel along with the master warning lamp, both the annunciator panel lamp and the master warning lamp shall be deenergized automatically when operation of the sensing elements ceases;

(5) When the push-button test switch is closed all of the annunciator panel lamps and the master warning lamp shall be energized;

(6) Whenever the dimming switch is closed the various annunciator lamps along with the master warning lamp shall be dimmed;

(7) The warning system shall include means to test other essential components of the warning system such as relays and resistors apart from the lamps;

(8) Failure of the components of either the test circuits or the dimming circuits shall in no way impair the operation of the remaining circuits.

The invention meets these requirements by circuitry that is simple and reliable and that may be embodied in an exceptionally compact unit having relatively inexpensive components. In this regard one feature of the invention is the use of simple resistors to prevent the lighting of an annunciator lamp in one lamp circuit from causing the lighting of an annunciator lamp in another lamp circuit. Any current that may flow from one lamp circuit to a second lamp circuit must pass through two such resistors with a consequent total voltage drop that precludes the lighting of a lamp in the second circuit.

As will be explained, the preferred practice of the invention is characterized by the concept of three circuits for each sensing element. A first circuit for each sensing element connects the sensing element with a corresponding annunciator lamp to energize the annunciator lamp in response to operation of the sensing element. A second circuit for each sensing element energizes the master warning signal in response to operation of the sensing element. A third circuit for each sensing element is responsive to the push-button reset switch to deenergize the master warning lamp.

The various features and advantages of the invention will be understood from the following detailed description considered with the accompanying drawing.

The drawing, which is to be regarded as merely illustrative, shows a wiring diagram of the presently preferred embodiment of the invention.

The wiring diagram shows only three sensing elements but the usual warning system has more than three and as many sensing elements may be included as may be desired. The warning system includes what may be termed an annunciator unit represented by the broken line rectangle 10. The annunciator unit 10 provides a panel 11 worded "flap unsafe" and corresponding to sensing element No. 1, a panel 12 worded "gear unsafe" and corresponding to sensing element No. 2, and a panel 13 that is worded "fire" and correspondings to sensing element No. 3. Preferably each of the three panels is provided with two lamps in parallel, panel 11 being provided with a pair of lamps 16, panel 12 being provided with a pair of lamps 18, and panel 13 being provided with a pair of lamps 20. As indicated in the diagram, the unit 10 may also be provided with a master warning lamp, a dimming switch, a push-button test switch, and a push-button re-set switch.

The present invention is directed to the circuitry of the warning system as a whole and the preferred practice of the invention is specifically directed to the circuitry of a control unit for the warning system, which control unit is represented by the broken line rectangle 22. The control unit 22 may comprise a box-like casing suitably adapted for connection with the various sensing elements and with the annunciator unit 10. Preferably the electrical connections between the control unit 22 and the annunciator unit 10 are provided by plug-in fittings in a well known manner.

In the wiring diagram, it is assumed that all of the sensing elements are out of operation with all of the lamps of the annunciator unit deenergized and with all of the switches of the annunciator unit open. All of the relays are shown in their normal deenergized state with the relay contactors in their normal positions.

The control unit 22 that is used in the present embodiment of the invention includes the following relays: relay A corresponding to the first sensing element No. 1 and having a normally closed contactor A–1 and a normally open contactor A–2; relay B corresponding to sensing element No. 2 and having a normally closed contactor B–1 and a normally open contactor B–2; relay C corresponding to the sensing element No. 3 and having a normally closed contactor C–1 and a normally open contactor C–2; relay M having a normally open contactor M–1 for controlling the master warning lamp; relay D corresponding to the dimming switch and having four normally closed contactors D–1, D–2, D–3, and D–4; relay T corresponding to the test switch and having three normally open contactors T–1, T–2, and T–3; and relay R corresponding to the reset switch and having three normally open contactors R–1, R–2, and R–3.

For energization of the warning system, the control unit 22 has a bus 24 to ground and a second bus 25 for connection to a twenty-eight volt source. The circuit for the master warning lamp includes a wire 26 from bus 24 to the lamp, a wire 28 from the lamp to one side of the contactor D–4 and one side of a dimming resistor 30, a wire 32 from the dimming resistor and the contactor D–4 to the contactor M–1, the second side of the contactor M–1 being connected to the bus 25. The dimming circuit includes a wire 34 from bus 24 to the dimming switch and a wire 35 from the dimming switch to the coil of relay D, the second side of the relay coil being connected to the bus 25.

The test circuit includes a wire 36 from bus 24 to one side of the push-button test switch and a wire 38 from the test switch to one side of the coil of relay T, the second side of the coil being connected to the bus 25. The re-set circuit includes a wire 40 from bus 24 to the push-button re-set switch and a wire 42 from the re-set switch to one side of the coil of relay R, the second side of the relay coil being connected to the bus 25.

As heretofore indicated, for each of the three sensing elements there is a corresponding first circuit for energizing the appropriate annunciator lamp, a second circuit for energizing the master warning lamp, and a third circuit that is controlled by the re-set switch.

The first circuit for sensing element No. 1 includes a wire 44 from bus 24 to the sensing element, a wire 45 from the sensing element to one side of contactor D–1 and one side of a dimming resistor 46, wire 48 from contactor D–1 and resistor 46 to one side of the two annunciator panel lamps 16 and a wire 49 from the panel lamps to the bus 25. In like manner the first circuit for sensing element No. 2 includes a wire 50, a wire 52, a dimming resistor 54 in parallel with contactor D–2 a wire 56 to the annunciator panel lamps 18, a wire 57 and the previously mentioned wire 49 to the second bus 25. In like manner the first circuit for sensing element No. 3 includes a wire 58, a wire 59, a dimming resistor 60 in parallel with contactor D–3, a wire 62 to the annunciator panel lamps 20, a wire 64, the previously mentioned wires 57 and 49 to the bus 25.

Contactor T–1 connects bus 24 with wire 48 to shunt sensing element No. 1; contactor T–2 connects bus 24 with wire 56 to shunt sensing element No. 2; and contactor T–3 connects bus 24 with wire 62 to shunt sensing element No. 3.

The second circuit for sensing element No. 1 includes a wire 65 connecting wire 45 with contactor A–1 and includes the resistor 66 that connects contactor A–1 with the coil of relay M the second side of the relay coil being connected to the bus 25. The second circuit for sensing element No. 2 includes a wire 68 connecting wire 52 with contactor B–1 and includes a resistor 69 that connects the contactor to the coil of relay M. In like manner the second circuit for annunciator element No. 3 includes a wire 70 connecting wire 59 with contactor C–1 and includes a resistor 72 that connects contactor C–1 with the coil of relay M.

The third circuit for sensing element No. 1 includes the coil of relay A, one side of which is connected to wire 65 and the other side of which is connected to contactors A–2 and R–1 in parallel, these two contactors being connected by a wire 74 with the second bus 25. The third circuit for sensing element No. 2 includes the coil of relay B, one side of which is connected to wire 68 and the other side of which is connected to the two contactors B–2 and R–2 in parallel, these two contactors being connected by a wire 75 to the bus 25. In like manner the third circuit for sensing element No. 3 includes the wire 70 from wire 59 the coil of relay C. The two contactors C–2 and R–3 in parallel and a wire 76 that connects the two contactors with the bus 25.

*Operation of the warning system*

If sensing element No. 1 closes, for example, it energizes the corresponding annunciator panel lamps 16 through the normally closed dimming relay contactor D–1 in its first circuit and simultaneously energizes the master warning lamp relay M through the normally closed contactor A–1 and resistor 66 in its second circuit. Energization of the relay M closes the contactor M–1 to energize the master warning lamp. If sensing element No. 1 now opens, the two annunciator panel lamps 16 will be deenergized and the relay M will be deenergized to cause the contactor M–1 to open for deenergization of the master warning lamp.

If sensing element No. 1 closes and stays closed, but the push-button re-set switch S is depressed, the annunciator panel lamps 16 remain energized but the master warning is deenergized. The momentary closing of the push-button re-set switch energizes relay R to close contactor R–1 in the third circuit of sensing element No. 1 to energize relay A. The energization of relay A opens contactor A–1 to deenergize the master warning lamp relay M and simultaneously closes contactor A–2. Deenergization of relay M opens contactor M–1 to open the circuit for the master warning lamp and contactor A–2 latches the third circuit closed to keep relay A energized as long as sensing element No. 1 remains closed. If sensing element No. 1 now opens, relay A will be deenergized with consequent opening of contactor A–2 and closing of contactor A–1. The third circuit of sensing element No. 1 is thereby readied to cause energization of the master warning lamp again in the event that sensing element No. 1 closes again.

Closing the dimming switch energizes relay D to cause contactors D–1, D–2, D–3 and D–4 to open. The opening of these contactors places the dimming resistors 46, 54 and 60 in the first circuits of the three sensing elements and the opening of the contactor D–4 places the dimming resistor 30 in the circuit of the master warning lamp. The inclusion of the dimming resistors in the lamp circuits dims the various lamps.

Depressing the push-button test switch energizes test relay T to close the three contactors T–1, T–2 and T–3. These three contactors shunt the three sensing elements, respectively, and thereby cause the annunciator panel lamps 16, 18 and 20 to be energized.

To test the relays, the push-button test switch is first depressed. Then the re-set switch is depressed while the test switch is held depressed. If the master warning light does not extinguish, a relay is defective. As heretofore pointed out, depressing the push-button test switch closes the contactors T–1, T–2 and T–3 to light up the annunciator panel lamps 16, 18 and 20 and the master warning lamp. If relays A, B, C, and R are in working order the closing of the push-button re-set switch results in energization of the three relays A, B, and C thereby extinguishing the master warning lamp. If relay A is not in working order, contactor A-1 will remain closed to cause the master warning lamp to light up; and in like manner failure of relay B or failure of relay C will also cause the master warning lamp to remain lighted up because the corresponding contactors B-1 or C-1 will remain closed.

It will be noted that when any of the second circuits of the three sensing elements is closed, the three resistors 66, 69 and 72 are placed in parallel circuits that would ordinarily result in lighting up annunciator panel lamps in other circuits by back flow of current. Thus if sensing element No. 1 closes to light up annunciator panel lamps 16 and the push-button re-set switch is not depressed, current may flow back through resistor 69 to energize the annunciator panel lamps 18 and may also flow back through resistor 72 to energize annunciator panel lamps 20. In this regard, a feature of the invention is that the operating voltages of the annunciator panel lamps is too high for a lamp to light up when the current is dropped in voltage by the resistors 66, 69 and 72. It is to be noted that any such back flowing of current must pass through two of the resistors in series to result in a drastic voltage drop. Thus if only sensing element No. 1 is closed, current to energize annunciator panel lamps 18 must pass through resistor 66 and resistor 69 in series. This arrangement eliminates the need for relays or selenium rectifiers to accomplish the same purpose.

In one practice of the invention, for example, a well known type of lamp bulb designated AN 3140-327 was used for the annunciator panel lamps and with a twenty-eight volt source. The dimming resistors each had a resistance of 180 ohms and the three parallel resistors 66, 69 and 72 each had a resistance of 390 ohms.

Although the now preferred embodiment of the present invention has been shown and described herein, it is to be understood that the invention is not to be limited thereto, for it is susceptible to changes in form and detail within the scope of the appended claims.

I claim:

1. In an electrical warning system for indicating the operational state of certain components in an aircraft and the like, and which system includes, a voltage source, a plurality of sensing elements individually adapted to close upon the occurrence of different abnormal conditions in the aircraft, a corresponding plurality of annunciator means respectively indicating the happening of such different abnormal conditions in the aircraft, a master warning indicator means for indicating the happening of each of the abnormal conditions, a common reset means for deenergizing the master warning indicator means, and a common dimming switch means for reducing the output of the annunciator means, the combination of: a first plurality of circuits for the sensing switch elements respectively connecting the sensing switch elements and respective ones of the annunciator means in series across the voltage source to energize respective ones of the annunciator means upon the closure of corresponding ones of the sensing switch elements, a second plurality of further circuits for respective ones of the sensing switch elements having a common connection with the master warning indicator means for energizing the master warning indicator means in response to the closure of any of the sensing switch elements, a third plurality of further circuits for respective ones of the sensing switch elements having a common connection with the reset means for opening an activated one of the circuits of the second plurality independently of the corresponding activated one of the circuits of the first plurality upon the actuation of the reset means subsequent to a closure of the sensing switch element in such corresponding circuit of the first plurality, a dimming impedance means for each of the annunciator means, a fourth plurality of further circuits for the sensing switch elements having a common connection to the dimming switch means for interposing a different one of the dimming impedance means in each of the circuits of the first plurality upon the actuation of the dimming switch means, and isolation means individually included in the circuits of at least one of the pluralities of further circuits and respectively interposed between respective ones of the sensing switch elements and the common connection of such circuits to prevent inter-action between any one of the first circuits and others of the first circuits upon the closure of the sensing switch element in such one of the first circuits.

2. In an electrical warning system for indicating the operational state of certain components in an aircraft and the like, and which system includes, a voltage source, a plurality of sensing switch elements individually adapted to close upon the occurrence of different abnormal conditions in the aircraft, a corresponding plurality of annunciator means respectively indicating the happening of such different abnormal conditions in the aircraft, a master warning indicator means for indicating the happening of each of the abnormal conditions, a common reset switch means for deenergizing the master warning indicator means, and a common dimming switch means for reducing the output of the annunciator means, the combination of: a first plurality of circuits for the sensing switch elements for respectively connecting the sensing switch elements and respective ones of the annunciator means in series across the voltage source to energize a predetermined one of the annunciator means upon the closure of a corresponding sensing switch element, a second plurality of further circuits for respective ones of the sensing switch elements having a common connection with the master warning indicator means for energizing the same in response to the closure of any one of the sensing switch elements, a third plurality of further circuits for the sensing switch elements having a common connection with the reset switch means, each of the further circuits of the third plurality including a relay winding to be energized upon the joint closure of the corresponding sensing switch means and of the reset switch means, a normally closed relay contact included in each of the further circuits of the second plurality and adapted to be opened upon the energizing of the relay winding in the corresponding further circuit of the third plurality, a dimming impedance element for each of the annunciator means included in respective ones of the circuits of the first plurality, a fourth plurality of further circuits for the sensing switch elements having a common connection to the dimming switch means for selectively short-circuiting the impedance elements in each of the circuits of the first plurality, and a plurality of isolation elements individually included in the circuits of at least one of said pluralities of further circuits and respectively interposed between respective ones of the sensing switch elements and the common connection thereof to prevent inter-action between any one of the first circuits and others of the first circuits upon the closure of the sensing switch element in such one of the first circuits.

3. The combination defined in claim 2 in which said isolation elements are individually included in the further circuits of said second plurality.

4. The combination defined in claim 2 in which said isolation elements constitute a plurality of resistors individually included in the circuits of said second plurality in series with the common connection thereof.

5. The combination defined in claim 2 in which a normally open holding relay contact is included in each of the further circuits of third plurality in series with said relay winding therein and with the corresponding one of the sensing switch elements to be closed by the energizing of such winding thereby to maintain such winding energized and the relay contact in the corresponding further circuit of the second plurality open upon the opening of the reset switch means and until the opening of the corresponding sensing switch element.

6. The combination defined in claim 2 in which the common connection to the reset switch means includes a relay winding, and in which normally open relay contacts are included in respective ones of the further circuits of the second plurality to be actuated by said last-named relay winding.

7. The combination defined in claim 2 in which the common connection to the dimming switch means includes a relay winding, and in which individual relay contacts are included in respective ones of the further circuits of the fourth plurality to be actuated by said last-named relay winding.

References Cited in the file of this patent
UNITED STATES PATENTS

| | | |
|---|---|---|
| 2,493,548 | Proctor | Jan. 3, 1950 |
| 2,565,323 | Quinn | Aug. 21, 1951 |
| 2,600,132 | Seaton | June 10, 1952 |
| 2,695,400 | Snitjer | Nov. 23, 1954 |
| 2,709,250 | Marmorstone | May 24, 1955 |
| 2,730,702 | Marmorstone | Jan. 10, 1956 |